UNITED STATES PATENT OFFICE.

ROSWELL D. CLARK, OF CORTEZ, NEVADA.

PROCESS OF PURIFYING HYPOSULPHITE SOLUTIONS USED IN LEACHING ORES.

SPECIFICATION forming part of Letters Patent No. 387,339, dated August 7, 1888.

Application filed December 19, 1887. Serial No. 258,403. (No specimens.)

*To all whom it may concern:*

Be it known that I, ROSWELL D. CLARK, of Cortez, Lander county, State of Nevada, have invented an Improvement in the Process of Purifying Hyposulphite Solutions used in Leaching Ores; and I hereby declare the following to be a full, clear, and exact description of the same.

My invention relates to an improved process of purifying hyposulphite solutions used in leaching ores; and it consists in a means for regenerating the leaching solution after it has become vitiated so that it will not dissolve the silver properly.

I have here described my improvement as applied to what is known as the "Von Patera process," in which the ores are first roasted with salt, cooled, moistened, put into tanks, and leached with a weak solution of hyposulphite of soda, the silver being afterward precipitated by sulphide of calcium. The sulphide is afterward collected, filtered, and roasted, so as to drive out most of the sulphur, and the residue is melted into bars. In this process the hyposulphite of soda becomes vitiated by the formation of sulphate of lime and other impurities which accumulate and prevent the silver from dissolving to its full chlorination assay.

My invention consists in the addition of chemically-pure bicarbonate of soda to this solution. By the addition of this substance the sulphate of lime is precipitated as a carbonate, thus restoring the solution to its full strength and effect for leaching purposes. In practical work I have found that some further action takes place—which I am not yet able to explain—by which the solution is given an extracting power of from three to five per cent. above the chlorination assay. The bicarbonate of soda is added to the leaching solution in quantities depending upon the amount of solution to be treated, and the necessity for it can always be discovered by taking a small quantity of the leaching solution and placing some bicarbonate of soda in it. If a flocculent precipitate occurs, it is necessary to add more bicarbonate to the main solution. By this process I am enabled to keep the solution up to its proper standard at all times, and at a comparatively small expense.

This process has been successfully and continuously worked at one of the leading mills in this country for several months, and after careful computation it has been found that the output of the mill has been increased from three to five per cent. by the simple addition of the bicarbonate of soda to the leaching solution, as herein stated.

Having thus described my invention, what I claim as new, and desire to secure by Letters Patent, is—

The improvement in leaching ores with hyposulphite solutions, consisting in regenerating and improving the leaching solution employed for this purpose by the addition of bicarbonate of soda, substantially as herein described.

In witness whereof I have hereunto set my hand.

ROSWELL D. CLARK.

Witnesses:
    S. H. NOURSE,
    H. C. LEE.